(12) United States Patent
Steinmeyer et al.

(10) Patent No.: US 9,956,957 B2
(45) Date of Patent: May 1, 2018

(54) METHOD AND DEVICE FOR REGULATING A LONGITUDINAL ACCELERATION OF A VEHICLE

(71) Applicant: SCANIA CV AB, Södertälje (SE)

(72) Inventors: Simon Steinmeyer, Braunschweig (DE); Marc-Michael Meinecke, Sassenburg (DE); Pär German, Oxelösund (SE); Jon Andersson, Rönninge (SE)

(73) Assignee: SCANIA CV AB (SE)

( * ) Notice: Subject to any disclaimer, the term of this patent is extended or adjusted under 35 U.S.C. 154(b) by 173 days.

(21) Appl. No.: 14/650,500

(22) PCT Filed: Dec. 5, 2013

(86) PCT No.: PCT/SE2013/051455
§ 371 (c)(1),
(2) Date: Jun. 8, 2015

(87) PCT Pub. No.: WO2014/092631
PCT Pub. Date: Jun. 19, 2014

(65) Prior Publication Data
US 2015/0307097 A1    Oct. 29, 2015

(30) Foreign Application Priority Data
Dec. 12, 2012    (DE) .......... 10 2012 112 141

(51) Int. Cl.
*B60W 30/14*    (2006.01)
*B60W 30/16*    (2012.01)
(Continued)

(52) U.S. Cl.
CPC ............ *B60W 30/14* (2013.01); *B60W 30/16* (2013.01); *B60W 30/17* (2013.01);
(Continued)

(58) Field of Classification Search
CPC ....... B60W 30/16; B60W 30/17; G08G 1/167
(Continued)

(56) References Cited

U.S. PATENT DOCUMENTS 7,353,401 B2    4/2008  Liang
7,610,121 B2 *  10/2009 Nishira .................... B60T 7/22
                                                340/901

(Continued)

FOREIGN PATENT DOCUMENTS

DE    197 43 958 A1    4/1999
DE    103 49 434 A1    6/2004
(Continued)

OTHER PUBLICATIONS

Efficient control of vehicles in congested traffic using model predictive control; M. A. S. Kamal; J. Imura; A. Ohata; T. Hayakawa; K. Aihara; Control Applications (CCA), 2012 IEEE International Conference on; Year: 2012; pp. 1522- 1527, DOI: 10.1109/CCA. 2012.6402427.*

(Continued)

*Primary Examiner* — Cuong H Nguyen
(74) *Attorney, Agent, or Firm* — Ostrolenk Faber LLP

(57) ABSTRACT

Regulation of a longitudinal acceleration of a main vehicle (10), particularly a truck, includes: detecting a driving behavior of vehicles traveling in front of a preceding vehicle that is traveling immediately in front of the main vehicle (10), regulating the longitudinal acceleration of the main vehicle (10) based on an evaluation of the driving behavior of the vehicles in such a way as to minimize energy consumption of the main vehicle (10).

8 Claims, 2 Drawing Sheets

(51) Int. Cl.
*B60W 30/17* (2012.01)
*B60W 50/00* (2006.01)

(52) U.S. Cl.
CPC ..... *B60W 50/0097* (2013.01); *B60W 2420/42* (2013.01); *B60W 2420/52* (2013.01); *B60W 2420/62* (2013.01); *B60W 2530/10* (2013.01); *B60W 2550/142* (2013.01); *B60W 2550/20* (2013.01); *B60W 2550/406* (2013.01); *B60W 2550/408* (2013.01); *B60W 2720/103* (2013.01); *B60W 2720/106* (2013.01); *B60W 2750/308* (2013.01); *B60Y 2200/14* (2013.01)

(58) Field of Classification Search
USPC .......................................... 701/70, 93, 96, 99
See application file for complete search history.

(56) References Cited

U.S. PATENT DOCUMENTS

| | | | |
|---|---|---|---|
| 8,600,609 B2 | 12/2013 | Holzmann | 701/29.3 |
| 2005/0125134 A1* | 6/2005 | Iwatsuki | B60T 8/1755 701/70 |
| 2005/0125137 A1* | 6/2005 | Shiiba | B60K 31/0008 701/96 |
| 2006/0022811 A1* | 2/2006 | Haug | B60R 1/00 340/436 |
| 2006/0095193 A1* | 5/2006 | Nishira | B60T 7/22 701/96 |
| 2006/0217866 A1 | 9/2006 | Moebus | |
| 2007/0276577 A1* | 11/2007 | Kuge | B60W 10/06 701/96 |
| 2008/0015778 A1* | 1/2008 | Matsuura | G08G 1/166 701/301 |
| 2008/0071460 A1* | 3/2008 | Lu | B60T 7/18 701/93 |
| 2008/0312802 A1* | 12/2008 | Kaigawa | B60W 30/16 701/96 |
| 2009/0299598 A1 | 12/2009 | Boecker et al. | |
| 2009/0312933 A1 | 12/2009 | Hoetzer | |
| 2010/0191318 A1 | 7/2010 | Stinson et al. | |
| 2010/0217486 A1* | 8/2010 | Taguchi | B60T 7/042 701/41 |
| 2011/0010094 A1* | 1/2011 | Simon | B60W 30/16 701/301 |
| 2012/0083987 A1 | 4/2012 | Schwindt | |
| 2012/0191318 A1* | 7/2012 | Holzmann | B60W 30/16 701/96 |
| 2013/0238211 A1* | 9/2013 | Kuge | B60W 10/06 701/96 |
| 2015/0183441 A1* | 7/2015 | Aoki | B60W 40/09 434/62 |
| 2017/0217424 A1* | 8/2017 | Park | B60W 20/11 701/22 |

FOREIGN PATENT DOCUMENTS

| | | | | |
|---|---|---|---|---|
| DE | 10 2008 036 131 A1 | 3/2009 | | |
| DE | 102008036131 A1 | * 3/2009 | ............ | B60W 30/16 |
| DE | 10 2008 019 174 A1 | 10/2009 | | |
| DE | 102008019174 A1 | * 10/2009 | ............ | B60W 30/16 |
| DE | 10 2009 021 476 A1 | 11/2010 | | |
| DE | 102009021476 A1 | * 11/2010 | ............ | B60W 30/16 |
| DE | 11 2009 001 203 T5 | 3/2011 | | |
| DE | 10 2010 029 467 A1 | 12/2011 | | |
| EP | 2 251 240 A1 | 11/2010 | | |
| EP | 2 481 650 A1 | 8/2012 | | |
| WO | WO 2007/098999 A1 | 9/2007 | | |
| WO | WO 2009/021598 A1 | 2/2009 | | |
| WO | WO 2012/091637 A1 | 7/2012 | | |

OTHER PUBLICATIONS

Smart Driving of a Vehicle Using Model Predictive Control for Improving Traffic Flow; Md. Abdus Samad Kamal; Jun-ichi Imura; Tomohisa Hayakawa; Akira Ohata; Kazuyuki Aihara; IEEE Transactions on Intelligent Transportation Systems; Year: 2014, vol. 15, Issue: 2; pp. 878-888, DOI: 10.1109/TITS.2013.2292500.*
Model Predictive Control of Vehicles on Urban Roads for Improved Fuel Economy; Md. Abdus Samad Kamal; Masakazu Mukai; Junichi Murata; Taketoshi Kawabe; IEEE Transactions on Control Systems Technology; Year: 2013, vol. 21, Issue: 3 pp. 831-841, DOI: 10.1109/TCST.2012.2198478.*
Development of preceding vehicle recognition algorithm for lead vehicle of autonomous platooning system based on multi sensor fusion and digital map; Tadayuki Okada; Nao; Suganuma; SICE Annual Conference (SICE), 2011 Proceedings of; Year: 2011 pp. 247-250.*
Adaptive neuro-fuzzy predictive control for design of adaptive cruise control system; Yu-Chen Lin; Ha-Ly Thi Nguyen; Cheng-Hsien Wang; 2017 IEEE 14th International Conference on Networking, Sensing and Control (ICNSC), year: 2017; pp. 767-772.*
Predictive energy management strategy for fully electric vehicles based on hybrid model predictive control; Shuwei Zhang; Yugong Luo; Keqiang Li; Junmin Wang; 2017 American Control Conference (ACC); Year: 2017; pp. 3625-3630; IEEE Conferences.*
International Search Report dated Mar. 28, 2014 issued in corresponding International patent application No. PCT/SE2013/051455.
International Preliminary Report on Patentability dated May 11, 2015 issued in corresponding International patent application No. PCT/SE2013/051455.

* cited by examiner

METHOD AND DEVICE FOR REGULATING A LONGITUDINAL ACCELERATION OF A VEHICLE

CROSS-REFERENCE TO RELATED APPLICATIONS

The present application is a 35 U.S.C. § § 371 national phase conversion of PCT/SE2013/051455, filed Dec. 5, 2013, which claims priority of German Patent Application No. 102012112141.9, filed Dec. 12, 2012, the contents of which are incorporated by reference herein. The PCT International Application was published in the English language.

The present invention concerns a method and a device for regulating longitudinal acceleration of a main vehicle, particularly a truck, but also an electric or hybrid vehicle.

WO 2007/098999 A1 and U.S. Pat. No. 7,853,401 B2 concern a device for turning an engine of a motor vehicle on and off as a function of the traffic situation wherein least one additional vehicle in addition to the preceding vehicle is taken into account.

DE 103 49 434 A1 concerns a method for improving a headway-distance and following regulation system designed to maintain a set and/or determined minimum distance from a preceding vehicle.

In most prior-art methods for regulating longitudinal acceleration, improving driver comfort is a prime concern. In the case of trucks, however, fuel consumption is a more important economic factor, since fuel consumption has a direct impact on the operating costs of a truck. Especially in congested traffic, a truck consumes relatively large amounts of fuel due to launches from a stop, since adhesion has to be overcome. The adhesion that occurs with trucks during a launch process is more than ten times that associated with passenger vehicles, since static friction increases linearly with the weight of the main vehicle. A truck also needs more fuel to accelerate than a passenger vehicle, since a greater weight has to be accelerated.

SUMMARY OF THE INVENTION

The present invention has the object of regulating longitudinal acceleration of a main vehicle in such a way that the main vehicle drives more efficiently, in terms of fuel consumption, than in the prior art.

This object is achieved according to the invention by means of a method for regulating longitudinal acceleration as disclosed herein, a device for regulating longitudinal acceleration as disclosed herein and a main vehicle as disclosed herein.

In the context of the present invention, a method is provided for regulating longitudinal acceleration of a main vehicle, particularly a truck. The term "truck," as distinguished from a passenger vehicle, is understood here to mean a motor vehicle having an admissible total weight of more than 2.8 metric tons and intended to carry freight. The method according to the invention comprises the following steps:

Detecting a driving behavior of vehicles that are traveling in front of a so-called preceding vehicle, which preceding vehicle is traveling immediately in front of the main vehicle.

Regulating the longitudinal acceleration of the main vehicle as a function of an evaluation of the driving behavior of the vehicles in front of the preceding vehicle, to thereby minimize the energy consumption of the main vehicle during travel. The term "regulating the longitudinal acceleration" is understood here to mean an adjustment or regulation of all processes that lead to a positive or negative acceleration in the forward direction of the main vehicle. These processes include, for example, launching the main vehicle from a standstill or braking the main vehicle to a stop. In other words, regulating the longitudinal acceleration also includes deciding whether or when to launch the main vehicle from a standstill or whether or when to brake the main vehicle to a stop.

The term "minimizing the energy consumption" is understood here to mean optimizing the energy consumption needed to travel a given distance (especially in congested traffic). Prolonged standstill of the main vehicle without covering any distance whatsoever, so as to consume no energy whatsoever, is not an option of this invention.

By virtue of the described regulation of longitudinal acceleration, the present invention also advantageously makes for comfortable and speedy driving, by eliminating unnecessary braking operations and aiming at, as an ideal, the steadiest possible travel (through the traffic jam). In other words, by the inventive regulation of longitudinal acceleration together with energy consumption, the present invention also optimizes the comfort of the driver of the main vehicle by eliminating particularly strong negative accelerations.

Regulating the longitudinal acceleration as a function of the driving behavior of the vehicles in front of the preceding vehicle makes it possible to estimate very closely, especially in congested situations, when the procession of vehicles in front of the main vehicle will come to a stop or when the stagnant preceding vehicle will launch again as the queue of vehicles gets moving. The regulation of longitudinal acceleration can thus advantageously be performed better, in an energy-efficient manner, than if, for example, only the driving behavior of the preceding vehicle were taken into account.

It is explicitly noted that the present invention does not exclude the possibility of also detecting the driving behavior of the preceding vehicle and regulating the longitudinal acceleration additionally as a function of the detected driving behavior of the preceding vehicle.

The regulation of longitudinal acceleration according to the invention comprises in particular the following steps:
Deciding when the main vehicle itself should launch when the vehicles in front of the main vehicle start moving again from a standstill.
How (fast) the main vehicle moves in order to travel as energy-efficiently as possible.
Deciding when the main vehicle itself should stop when the vehicles in front of the main vehicle come to a stop.

In addition to trucks, the invention also concerns electric vehicles and hybrid vehicles, since, for example, unnecessary launching and braking processes in congested traffic are to be avoided for economic reasons with these propulsion systems, as well.

According to a preferred embodiment of the invention, a headway distance between the vehicles in front of the main vehicle is detected while those vehicles are stagnant. In other words, a determination is made of the headway distances between the preceding vehicle and the main vehicle traveling in front of the preceding vehicle, between the main vehicle traveling in front of the preceding vehicle and the main vehicle traveling in front of that main vehicle, and so on. If the first vehicle whose driving behavior is being detected (i.e., the main vehicle in the procession that is farthest from the main vehicle whose longitudinal acceleration is being regulated) then comes to a stop again, the future driving behavior of the preceding vehicle is determined on the assumption that the preceding vehicle will come to a stop when the distance between neighboring vehicles in the procession, up to the first vehicle, is equal to the previously detected headway distance. The longitudinal acceleration of the main vehicle is regulated in such a way that the main vehicle comes to a stop behind the then-stationary preceding vehicle with optimum energy consumption, taking a predefined safety headway distance into account. When the main vehicle has to brake in a traffic jam for the first time, so-called default parameters for the headway distance between the vehicles are used to regulate the longitudinal acceleration of the main vehicle.

In other words, in this embodiment, the length of the procession from the first vehicle to the preceding vehicle is first determined or measured during a stop. When the queue then gets moving again and the first vehicle comes to a stop again, it is assumed that the queue will close ranks so that the length of the queue is again equal to the measured length. In this case, the longitudinal acceleration is adjusted such that the main vehicle travels the distance from its current standstill position to its standstill position behind the preceding vehicle, when it has pulled up at the end of the queue, with the lowest possible energy consumption.

According to a further embodiment of the invention, a respective velocity profile is determined for each of the vehicles in front of the preceding vehicle and for the preceding vehicle. Such a velocity profile for the respective main vehicle gives the velocity of the main vehicle over time for the future. The velocity profile of the respective main vehicle is then adjusted suitably as a function of the velocity profile of the main vehicle traveling immediately in front of the respective main vehicle and as a function of a headway distance from the main vehicle traveling immediately in front of that. The longitudinal acceleration of the main vehicle is then regulated as a function of the velocity profile of the preceding vehicle and as a function of the headway distance between the main vehicle and the preceding vehicle. For example, by integrating the velocity profile of the preceding vehicle over time, it is possible to determine the distance yet to be traveled and the time required to travel this distance to a stopping point of the preceding vehicle.

The embodiment advantageously takes into account the fact that the driving behavior or velocity profile of any vehicle in a queue of vehicles is strongly influenced by the velocity profiles of the other vehicles in the queue. If, for example, a main vehicle in the queue (e.g., the first vehicle in the queue) changes its velocity profile, this change affects the velocity profile of the vehicles traveling behind it, especially in a traffic slowdown. In other words, in this embodiment, the movement of the entire queue is detected in order to determine, for example, the instant at which the main vehicle at a standstill can start off again or at which the moving vehicle has to stop again. With this embodiment, therefore, launch behavior and coasting in neutral can be optimized so that the main vehicle comes to a stop behind the preceding vehicle in the most energy-efficient manner possible.

The velocity profile of the preceding vehicle can also be used to control an automatic start/stop functionality of the main vehicle, which then can include driving on a downhill slope with the engine switched off.

The present invention uses in particular a statistical model that describes or models the driving behavior of the vehicles in front of the main vehicle whose longitudinal acceleration is to be regulated. This statistical model is then used to determine the future driving behavior of the preceding vehicle in order to regulate the longitudinal acceleration as a function of that behavior. Statistical data of this model include, for example, the headway distances between the vehicles and the velocity profiles of the vehicles, as mentioned in the previously described embodiments.

Advantageously, the more lane change maneuvers per time unit are detected between the main vehicle and the preceding vehicle, the smaller the headway distance that is maintained between the main vehicle and the preceding vehicle.

Setting lane change maneuvers aside, it is true as a rough generalization that the greater the headway distances that are left with respect to preceding vehicles, the lower the energy consumption of the main vehicle. In practice, however, the larger the gap or headway distance with respect to the preceding vehicle, the greater the number of vehicles that will merge into this gap. Thus, the more lane change maneuvers are detected per time unit, the smaller this headway distance should be made to be.

The to-be-maintained or optimal headway distance from the preceding vehicle can be made larger when it is determined automatically (e.g. by analyzing camera images or navigational data) that lane changes are currently impossible. This is the case, for example, when only one lane is available to the vehicles that are in front of the main vehicle.

The longitudinal acceleration of the main vehicle can further be regulated as a function of one or more of the following items of information or characteristics:

An uphill slope of the roadway on which the main vehicle is currently traveling.

The steeper the upslope, the more energy the main vehicle needs to launch. Hence, for example, the steeper the upslope, the later the decision to launch will come (i.e., at a proportionately greater headway distance from the preceding vehicle). In the case of a downhill slope, on the other hand, the steeper the down slope, the sooner the decision to launch will come (i.e., at a proportionately smaller headway distance from the preceding vehicle).

A weight of the main vehicle. The greater the weight of the main vehicle, the more energy the main vehicle needs to get moving. Thus, for example, the greater the weight of the main vehicle, the later the decision to launch will be made (i.e., at a proportionately greater headway distance from the preceding vehicle).

A starting torque of the main vehicle, which the main vehicle must apply in order to launch from a stop. As with regard to the weight of the main vehicle, the greater this starting torque of the main vehicle, the more energy the main vehicle needs to get moving. Thus, for example, the greater this starting torque of the main vehicle, the later the decision to launch will be made (i.e., at a proportionately greater headway distance from the preceding vehicle). Of the three items of information or characteristics "slope, weight and starting torque," starting torque is the most important item of information or characteristic and therefore has decisive importance for the longitudinal regulation according to the invention.

The longitudinal acceleration of the main vehicle is regulated to minimize energy consumption particularly in such a way that the frequency of stopping processes of the main vehicle in which the main vehicle comes to a complete stop is kept to the lowest possible minimum.

Since it is particularly true of trucks, as opposed to passenger cars, that a great deal of energy is needed to launch the main vehicle, energy consumption can advantageously be reduced by reducing the frequency of stopping processes. The frequency of stopping processes can be reduced, for example, by adjusting the velocity of the main vehicle in congested traffic such that an optimal headway distance, determined, for example, on the basis of the frequency of lane changes, is maintained as constantly as possible.

A device for regulating a longitudinal acceleration of a main vehicle, particularly a truck, is also provided in the context of this invention. Said device includes control means and sensing means. The sensing means are adapted to detect a driving behavior of vehicles traveling in front of the preceding vehicle that is immediately in front of the main vehicle. The control means are adapted to regulate or adjust the longitudinal acceleration of the main vehicle as a function of an evaluation of the driving behavior of the vehicles in such a way as to minimize an energy consumption of the main vehicle during travel.

The advantages of the device according to the invention are essentially the same as the advantages of the method according to the invention, which have been recited in detail above and thus will not be reiterated here.

Said sensing means can include one or more of the following devices:

- A radar. This can be a multi-beam radar sensor that is mounted on the main vehicle and is able to detect, for example under the preceding vehicle and through other vehicles traveling in front of it, still other vehicles traveling in front of them. This radar sensor can also be used for a system for automatically actuating the brakes in an emergency involving the main vehicle.
- A camera. Particularly in the case of trucks, this sensor or the camera can be mounted in a relatively high position of up to 4.5 m above the roadway, to capture images of a number of vehicles in front of the main vehicle. This camera can be, for example, a single-camera sensor, which can also be used for lane-keeping assistance systems of the main vehicle.
- A laser. A laser can be used to perform optical distance measurement of the headway distance from the preceding vehicle or the vehicles in front of the preceding vehicle.
- A device for vehicle-2-X communication (also known as V2X technology). Vehicle-2-X communication includes vehicle-2-infrastructure, vehicle-2-server and vehicle-2-vehicle communication or technology. In the case of vehicle-2-X communication, the vehicles constantly report their position and velocity to other vehicles by radio. Whereas this takes place directly (from vehicle to vehicle) in the case of vehicle-2-vehicle communication, in the case of vehicle-2-infrastructure or vehicle-2-server communication the communication proceeds via an infrastructure (a communication network, for example) or a server. As applied to automobiles, vehicle-2-X communication is also referred to as car-2-car communication or technology, which includes car-2-infrastructure, car-2-server and car-2-car communication.

As a result of the evaluation by the main vehicle of this information concerning the position and velocity of the preceding vehicle and the vehicles traveling in front of it, the longitudinal acceleration can advantageously be regulated as a function of this information. V2X technology is particularly advantageous compared to other sensing means because of its long look-ahead distance.

Finally, also provided in the context of the present invention is a main vehicle, particularly a truck, comprising a device according to the invention.

The present invention is particularly suited for trucks, but can also, of course, be used for passenger cars. In addition, the present invention can also be used for ships, aircraft and rail-mounted or rail-guided vehicles.

The present invention will be described in detail below on the basis of preferred embodiments, with reference to the figures.

Figure 1:
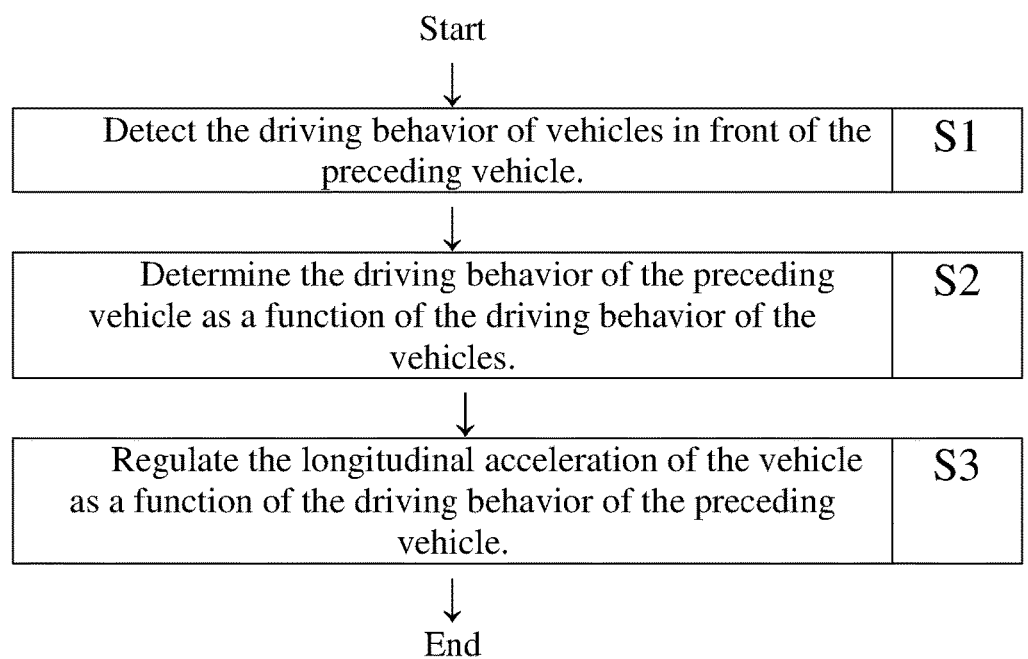
FIG. 1 shows a flow chart of a method according to the invention for regulating the longitudinal acceleration of a main vehicle.

The flow chart of a method according to the invention for regulating the longitudinal acceleration of a main vehicle is depicted in FIG. 1. In a first step S1, the driving behavior of vehicles in front of the preceding vehicle is detected. As a function of this information, in a second step S2 the future driving behavior of the preceding vehicle is determined, so that in a third step S3 the longitudinal acceleration of the main vehicle is regulated as a function of the future driving behavior of the preceding vehicle.

Figure 2:
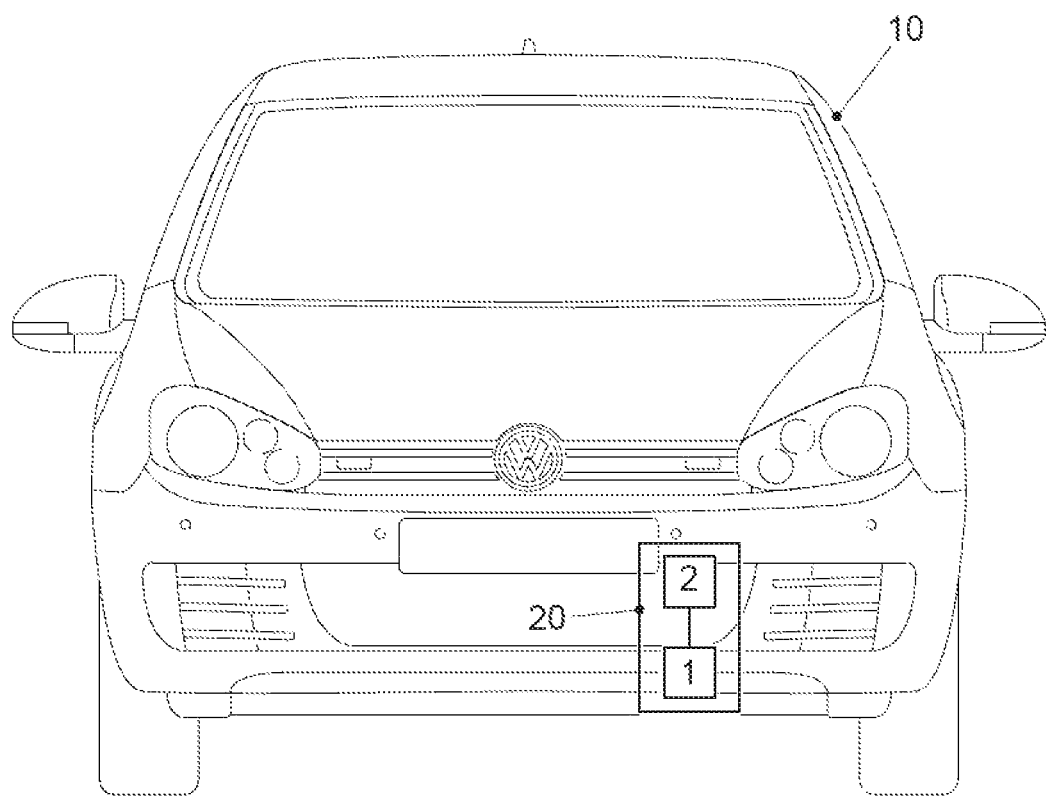
FIG. 2 is a schematic representation of a main vehicle according to the invention equipped with a device according to the invention.

FIG. 2 depicts a main vehicle 10 according to the invention, comprising a device 20 according to the invention for regulating the longitudinal acceleration of the main vehicle 10. This device 20 in turn comprises a controller 2 and a radar 1, which latter is mounted under the main vehicle 10 between the wheels of the main vehicle 10. By means of this radar 1, the driving behavior of the vehicles traveling in front of the main vehicle 10 is detected and transmitted to the controller 2. As a function of the driving behavior of the vehicles in front of the preceding vehicle, the future driving behavior of the preceding vehicle is determined by the controller 2 and the longitudinal acceleration of the main vehicle 10 is regulated as a function of this future driving behavior.

The invention claimed is:

1. A method for regulating longitudinal direction acceleration of a main vehicle, the method comprising:
    detecting driving behavior of a procession of vehicles traveling in front of a preceding vehicle,
    wherein the preceding vehicle is traveling immediately in front of the main vehicle, and the procession of vehicles comprises a first vehicle remote from the main vehicle and at least one additional vehicle between the first vehicle and the main vehicle;
    determining future driving behavior of the preceding vehicle based on a statistical model that describes or models the driving behavior of the procession of vehicles in front of the main vehicle,
    wherein the statistical model includes statistical data obtained from headway distances between the first vehicle and the at least one additional vehicle; and
    regulating, according to the determining of the future behavior of the preceding vehicle, the longitudinal acceleration of the main vehicle by minimizing a frequency of stopping processes of the main vehicle in which the main vehicle comes to a complete stop.

2. The method as in claim 1, further comprising:
    detecting a headway distance between neighboring vehicles in the procession of vehicles traveling in front of the preceding vehicle and the preceding vehicle when the procession of vehicles and the preceding vehicle are at a standstill;

when a standstill of the first vehicle is detected, determining the future driving behavior of the preceding vehicle on an assumption that the preceding vehicle will stop when the respective headway distance between neighboring vehicles in the procession between the preceding vehicle and the first vehicle is equal to the previously detected headway distance; and regulating the longitudinal acceleration of the main vehicle so as to stop the main vehicle behind the preceding vehicle with minimized energy consumption, taking a predefined safety headway distance into account.

3. The method as in claim 1, further comprising:

for vehicles traveling in front of the preceding vehicle and for the preceding vehicle, determining a velocity profile, for each vehicle, that gives the respective velocity of each vehicle over time for the future;

determining the velocity profiles of each vehicle and of the preceding vehicle as a function of the velocity profile of the vehicle traveling immediately in front of the respective vehicle with the profile then being determined or the preceding vehicle and as a function of a headway distance from the vehicle traveling immediately in front; and regulating the longitudinal acceleration of the main vehicle as a function of the velocity profile of the preceding vehicle and as a function of the headway distance between the main vehicle and the preceding vehicle.

4. The method as in claim 1, further comprising:

detecting more lane change maneuvers per time unit between the main vehicle and the preceding vehicle as a headway distance between the main vehicle and the preceding vehicle is kept smaller.

5. The method as in claim 1, further comprising:

regulating the longitudinal acceleration of the main vehicle as a function of at least one item of information selected from:

an uphill slope of a roadway on which the main vehicle is currently traveling, a weight of the main vehicle; and a starting torque of the main vehicle which the main vehicle applies in order to launch from a standstill.

6. A device for regulating longitudinal acceleration of a main vehicle, the device comprising:

a sensor configured to detect driving behavior of a procession of vehicles traveling in front of a preceding vehicle that is traveling immediately in front of the main vehicle, the procession of vehicles comprising a first vehicle remote from the main vehicle and at least one additional vehicle between the first vehicle and the main vehicle;

a controller configured to determine future driving behavior of the preceding vehicle based on a statistical model that describes or models the driving behavior of the procession of vehicles in front of the main vehicle, wherein the statistical model includes statistical data obtained from headway distances between the first vehicle and the at least one additional vehicle; and the controller configured to regulate, according to the determined future behavior of the preceding vehicle, the longitudinal acceleration of the main vehicle by minimizing a frequency of stopping processes of the main vehicle in which the main vehicle comes to a complete stop.

7. The device as in claim 6, wherein the sensor comprise at least one of the following devices:

a radar;

a camera;

a laser; and a device for vehicle-2-X communication.

8. A vehicle comprising wheels configured to propel the vehicle, and the device of claim 6.

* * * * *